Jan. 13, 1931.   H. W. JONES ET AL   1,788,575
BATTERY HAND LAMP
Filed June 22, 1928
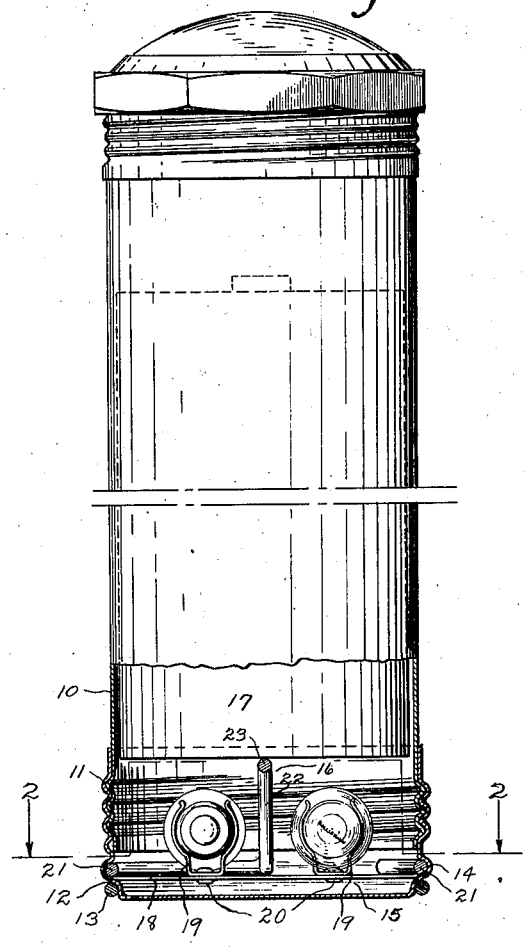
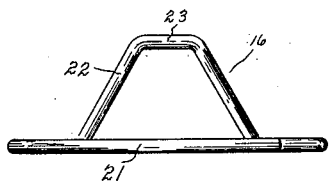
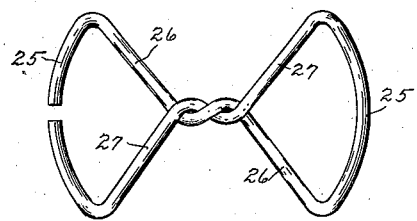
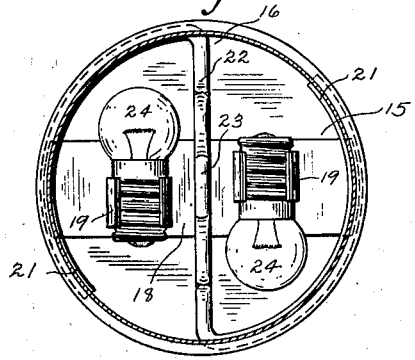
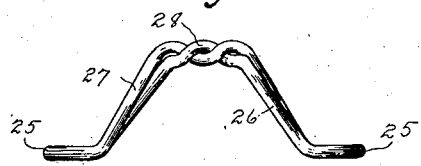
INVENTORS
Homer W. Jones
Herman S. Graubner
BY
Byrnes Townsend Dickenson ATTORNEYS

Patented Jan. 13, 1931

1,788,575

UNITED STATES PATENT OFFICE

HOMER WALTER JONES, OF NEWARK, NEW JERSEY, AND HERMAN G. GRAUBNER, OF NEW YORK, N. Y., ASSIGNORS TO NATIONAL CARBON COMPANY, INC., A CORPORATION OF NEW YORK

BATTERY HAND LAMP

Application filed June 22, 1928. Serial No. 287,478.

This invention relates to tubular battery hand lamps and the like and more specifically to an improved battery support and spare bulb holder for use with such lamps.

Battery supports as used in tubular hand lamps are both resilient and rigid and they usually serve to make contact with one terminal of the battery while supporting it so the other terminal is in contact with the lamp bulb or a conductor connected with the lamp bulb. These battery supports are usually carried by an end cap that is threaded to the casing, and in lamps where the end cap is adjusted on the casing to focalize the bulb and reflector the battery support is usually rigid. Heretofore, rigid battery supports were usually in the form of a drawn metal shell having an outturned flange at one end seated in an internal groove in the end cap, but this construction is expensive and difficult to attach. Therefore, one of the objects of this invention is a battery support of low cost that may be quickly and easily attached to an end cap.

When the area of contact between the battery support and the zinc casing of the lowermost battery cell is too large, the support will frequently fail to break through the oxide coating on the zinc casing and make contact with it. When the area of contact is too small the support is liable to dent or pierce the cell casing and injure the battery. Therefore, another object is a battery support that will make positive electrical contact with the zinc casing of a battery cell without injuring the battery.

Spare lamp holders have been used in combination with an end cap and a battery support but many of them are unsatisfactory because it is difficult to remove the spare lamp due to a lack of sufficient room to reach in and grasp it. Therefore, another object of this invention is a spare lamp holder from which the lamp may be easily withdrawn. Still other aims and objects will be apparent from the specification and drawing.

The above mentioned aims and objects of this invention are attained by the mechanism illustrated in the accompanying drawing in which:

Fig. 1 is a side view of a flashlight embodying this invention, parts being shown broken away and others being shown in section;

Fig. 2 is a view along line 2—2 of Fig. 1;

Fig. 3 is a side elevation of the battery support shown in Figs. 1 and 2; and

Figs. 4 and 5 are, respectively, a plan view and an elevation of an alternative battery support embodying this invention.

In the drawing 10 designates the tubular metallic casing of a flashlight of the type that is focussed by adjusting the end cap on the casing to move the battery and thereby impart a focussing movement to the lamp bulb. Threaded to the lower end of the casing 10 is an end cap 11 of well known form having an exterior groove 12 in which is hinged a conventional hanger ring 13. Formed in the wall of the end cap 11 just above the exterior groove 12 is an interior groove 14 in which is seated a spare lamp holder 15 that is held in place by a battery support 16. Within the casing 10 and resting upon the battery support 16 is the usual battery 17 of dry cells.

The spare lamp holder 15 is preferably a strip of sheet metal 18 having ends that conform to the inner wall of the end cap 11 and a length that permits it to be inserted in the interior groove 14 without bending or mutilation. Two resilient spare lamp receiving clips 19 are mounted upon the upper surface of the sheet metal support or base 18 by means of the rivets 20.

The battery support 16 is preferably a single piece of round metal rod or wire so bent and formed that it comprises a base consisting of two resilient arcuate portions 21 conforming to and seating in the interior groove 14, and a radial portion 22 connecting opposite ends of the arcuate portions 21. The center of the radial portion 22 is elevated above the spare lamp receiving clips 19 to provide room between the bottom of the end cap 11 and the battery 17 for the spare lamps 24 and their receiving clips 19 and, also, to provide a straight cylindrical portion 23 for the battery 17 to rest on. The area of contact between this raised portion 23 and the bottom of the battery 17 is small enough to cut through any film of oxide on the bottom of the battery 17 so electrical connection is always assured, and still the area of contact is large enough so the bottom of the battery will not be injured by the battery support during the operation and use of the flashlight.

The spare lamp receiving clips 19 are mounted on the supporting strip 18, and the complete lamp holder 15 and the battery support 16 are mounted in the end cap 11 and relatively positioned so the clips 19 are respectively located in the center of the two spaces in the end cap that are separated by the radial portion 22 of the battery support 16. There is sufficient room around each of the clips 19 so a person may reach in the end cap 11 and remove one or both of the lamp bulbs 24 without difficulty or inconvenience. As the battery support 16 is held in the groove 14 in the end cap 11 by spring tension only and serves to secure the lamp-holding strip 18 in place, it and the spare lamp holder may be removed and replaced whenever necessary without injuring these or the other parts of the flashlight.

The battery support 16 may be used in the end cap 11 without the spare bulb holder 15, as the absence of the spare bulb holder will not alter the operation or performance of the flashlight in any way. Also, the base 18 of the spare bulb holder 15 may be a circular disk of metal instead of the strip as shown, but we prefer the strip because it may be manufactured at a lower cost and be assembled in the end cap 11 with less difficulty.

The battery support 16 may be of brass, bronze, or steel, wire or rod, but in order to secure the necessary strength without using unduly large wire and at the same time to insure freedom from corrosion we prefer to use what is known as copper-clad steel wire. This wire may be easily formed into the shape desired without rupturing its coating, and when the battery support 16 is formed so the portions 21 have a somewhat greater diameter than that shown, the wire is sufficiently resilient so that the parts 21 may be contracted and inserted in the groove 14 in the end cap 11 where the support is securely held by its spring tension.

The battery support may be formed into various shapes other than that designated by the numeral 16. For instance, when a more rigid support is desired the one shown in Figs. 4 and 5 may be used. The support shown in these figures also consists of a single piece of wire formed so as to provide a base having two arcuate portions 25 on opposite sides thereof. The opposite ends of the base portions 25 are joined by the radial connection portions 26 and 27 which are twisted together and formed so their central battery-engaging portion is elevated as shown at 28. This support is very rigid and the area of contact between the support and the battery is less than that with the support 16. If a greater area of contact is desired the support may be made without twisting the connecting portions 26 and 27; in which form, the central part of both of the connecting portions 26 and 27 may be brought to the center and elevated to provide straight parallel portions which make contact with the bottom of the battery.

We claim:

1. In a tubular battery hand lamp, a formed wire battery support comprising a plurality of resilient portions adapted for seating in a groove and a portion adapted for supporting a battery in a fixed position with respect to said groove.

2. In a tubular battery hand lamp, a formed wire battery support comprising a plurality of resilient arcuate portions adapted for seating in a groove and a portion connecting said resilient portions and having an elevated portion adapted for supporting a battery in a fixed position with respect to said groove.

3. In a tubular battery hand lamp, the combination of an end cap having an internal annular groove therein and a battery support having a plurality of resilient portions seated in said groove and a portion adapted for supporting a battery in a fixed position with respect to said groove battery.

4. In a tubular battery hand lamp, the combination of an end cap having an internal annular groove therein and a battery support having a plurality of resilient portions seated in said groove and a connecting portion therebetween adapted for supporting a battery in a fixed position with respect to said groove.

5. In a tubular battery hand lamp, the combination of an end cap having an internal annular groove therein and a formed wire battery support comprising a plurality of resilient arcuate portions seated in said groove and an upright portion connecting said arcuate portions and adapted for supporting a battery in a fixed position with respect to said groove.

In testimony whereof, we affix our signatures.

HOMER WALTER JONES.
HERMAN G. GRAUBNER.